F. SCHWANHAUSSER.
LANTERN SLIDE CARRIER.
APPLICATION FILED FEB. 5, 1917.
1,233,407.
Patented July 17, 1917.
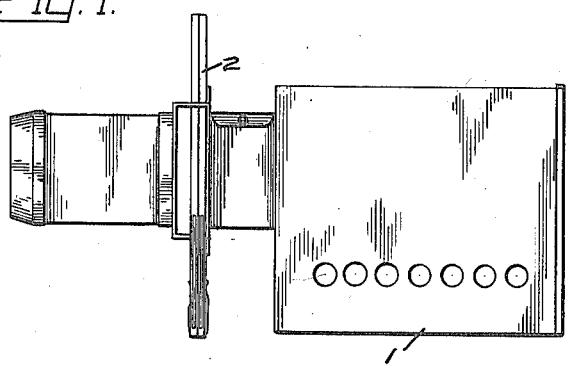
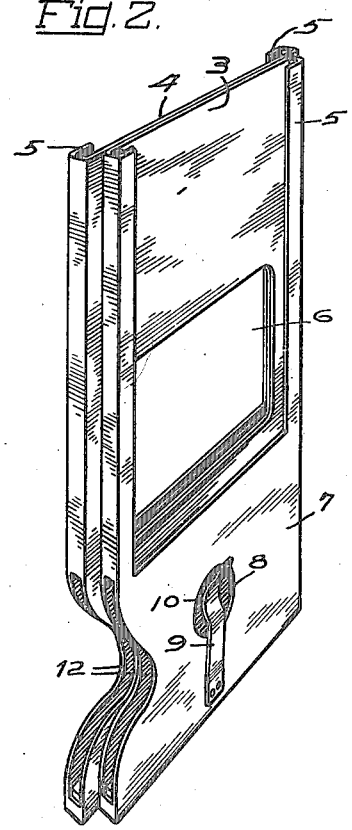
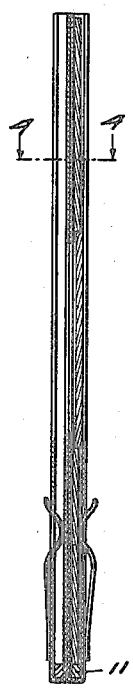
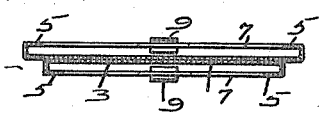
INVENTOR
Frederick Schwanhausser.
by
Owen, Owen & Crampton

UNITED STATES PATENT OFFICE.

FREDERICK SCHWANHAUSSER, OF JERSEY CITY, NEW JERSEY.

LANTERN-SLIDE CARRIER.

1,233,407.　　　　　　Specification of Letters Patent.　　Patented July 17, 1917.

Application filed February 5, 1917. Serial No. 146,816.

*To all whom it may concern:*

Be it known that I, FREDERICK SCHWANHAUSSER, a citizen of the United States, and a resident of Jersey City, in the county of Hudson and State of New Jersey, have invented a certain new and useful Lantern-Slide Carrier; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to slide carriers or guides for use in connection with stereopticon lanterns. It has for its object to provide a means whereby slides may be automatically dropped into position for projection, whereby the slides may be easily manipulated and a quick change of slides may be produced. Another object of my invention is to avoid the loss of time of drawing one slide from the position of projection and inserting another slide in its place. By my invention an operator may manipulate 2 or 3 picture projecting apparatus, or may be conducting a lecture and at desired times may readily change the view presented to his audience without going through the embarrassing operation of withdrawing a slide and inserting another, the carrier being so constructed that the slides will automatically drop into position. The invention also has for its object to provide a double carrier for different sizes of slides.

To show the practicability of my invention I shall describe hereinafter a carrier embodying the invention. The carrier selected, however, is merely illustrative of constructions containing the invention, which structures may partake of different forms and yet be within the scope of the claims hereinafter appended. The carrier described hereinafter is illustrated in the accompanying drawings.

Figure 1 of the drawings illustrates the carrier selected as mounted in a lantern. Fig. 2 is a perspective view of the double carrier. Fig. 3 is a vertical sectional view of the carrier and Fig. 4 is a transverse sectional view taken on the line 4—4 indicated in Fig. 3.

1, Fig. 1, is a lantern to which the double slide carrier 2 is secured by any suitable means. The slide carrier or double guide is formed of two parts, 3 and 4. The part 4 is made wider than the part 3, two sizes being provided in order that slides known as American slides or slides known as English slides, may be used. Each part may be formed of sheet metal and provided with inwardly turned flanges 5 which are disposed from the body of the part at a distance sufficient to permit the slides to slip between the body and the flanges 5. Each part of the slide carrier is also provided with an opening 6 through which the rays of light may be projected and through which the picture on the slide is projected upon the screen. The height of the opening 6 is somewhat less than the height of the portion of the part of the carrier located intermediate the opening and the top of the carrier and likewise intermediate the opening and the bottom of the carrier. The carrier may thus be filled with three slides. One slide will be located at the bottom of the carrier, the second slide will be located in front of the opening and in position for projection and the third slide will be located above the second and at the top of the carrier. The portion of the carrier above the opening, however, may be extended so that a plurality of slides may be located above the slide located opposite the opening 6, and so that the carrier will not only hold three slides but will hold four or five slides, as may be desired.

The lower portion of each part of the carrier may be inclosed, that is, a wall 7 may extend across the carrier to form an extension of the flanges 5. The wall 7 of each part of the carrier may be provided with an opening 8. A spring 9 may be secured to each wall 7 and have an arcuate portion 10 which extends into the space between the wall 7 and the body portion of each part of the carrier. The bent portion 10 of the spring is normally located in the path of the slides, so that when a slide passes down through each part of the carrier the bent portion 10 of the spring 9 is pressed outward against the yielding resistance of the spring, and so that the spring 9 yieldingly presses against the slide located in the bottom of one or the other of the parts of the carrier. Each part of the carrier may also be provided with a cushion 11 formed of rubber or felt, if desired.

The lower part of the side of each part of the carrier is provided with an opening 12 formed in the edge of each part of the carrier. The edges of the parts of the carrier may be curved inward, whereby the slide located in the lower part of either part of the carrier may be readily grasped between the thumb and finger and withdrawn from the part of the carrier in which it may be located. When the carrier is filled with the three slides and the lower one is withdrawn through the opening 12, the weight of the two upper slides will force the slides downward into the lower part of the carrier. The spring 9 will in the downward movement yieldingly and frictionally engage with the surface of the carrier moving from the position of exposure so as to gradually stop its downward movement and yet allow it to slip beneath the spring 9 until the lower edge of the slide thus engaged strikes the bottom of the carrier or the cushion 11. By this means a quick change will be made in the slides, the change being produced by merely drawing out from the lower part of the carrier one of the slides. Another slide may be inserted into the top of the carrier to take the place of the one that was removed from the top of the carrier. This is done after the change of views has been made.

The construction described may partake of different forms in its entirety as well as in its parts without departing from the spirit of the invention.

I claim:

1. A slide carrier having means for supporting three slides one above the other, and an opening located opposite the center slide for exposure of the center slide and having a second opening located in an edge of the carrier for removing the lower slide.

2. A slide carrier having means for supporting three slides one above the other, an opening located opposite the center slide for exposure of the center slide and having a second opening located in an edge of the carrier for removing the lower slide, and a spring for yieldingly engaging the middle slide when the lower slide is removed to reduce the downward movement of the middle slide and the upper slide.

3. A slide carrier having means for supporting three slides one above the other, an opening located opposite the center slide for exposure of the center slide and having a second opening located in an edge of the carrier for removing the lower slide, and a spring located in the center of the path of movement of the slides to frictionally engage and retard the movement of the two upper slides when the lower slide is removed.

In testimony whereof, I have hereunto signed my name to this specification.

FREDERICK SCHWANHAUSSER.